Jan. 2, 1968 W. P. SIEGMUND 3,361,511
FIBER OPTICAL IMAGE-ENCODING-DECODING DEVICE
Original Filed Oct. 27, 1960
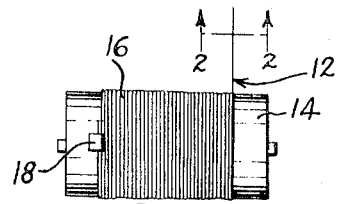
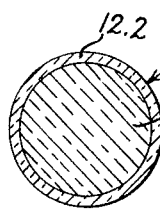
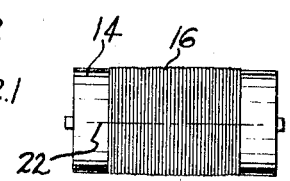
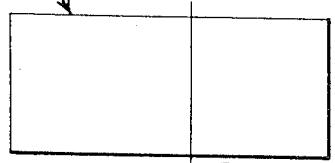
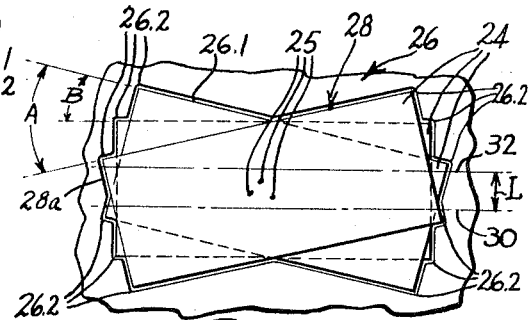
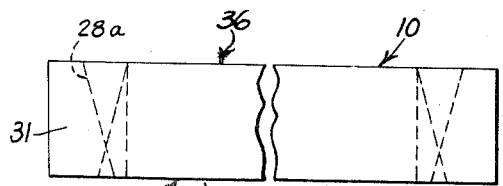
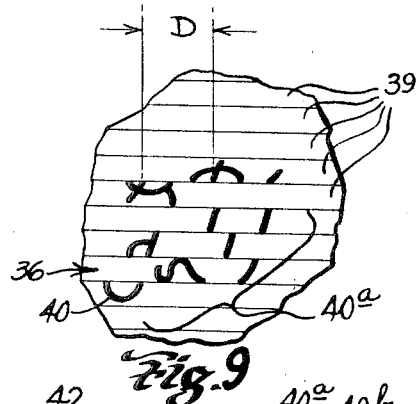
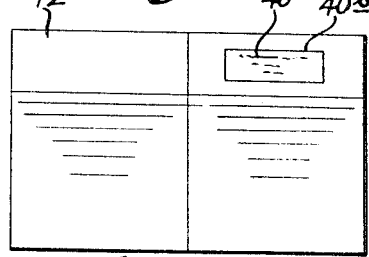
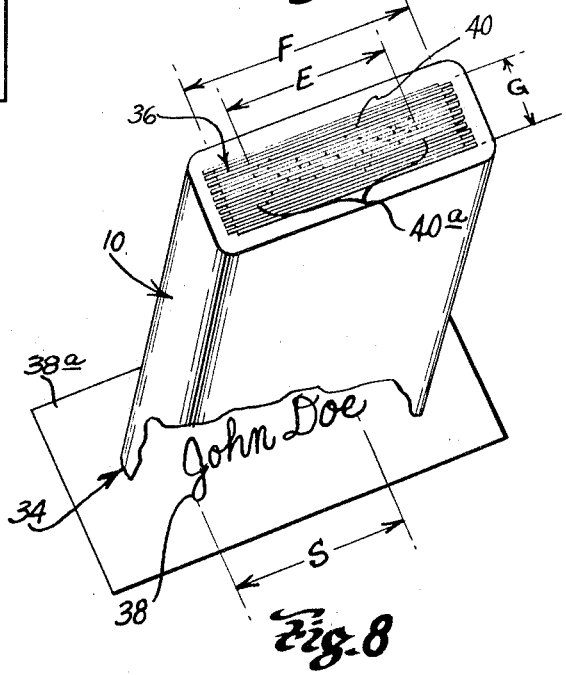
INVENTOR
WALTER P. SIEGMUND
BY Louis L. Gagnon
James P. McAndrews
ATTORNEYS

United States Patent Office 3,361,511
Patented Jan. 2, 1968

3,361,511
FIBER OPTICAL IMAGE-ENCODING-DECODING DEVICE
Walter P. Siegmund, Woodstock, Conn., assignor to American Optical Company, Southbridge, Mass., a voluntary association of Massachusetts
Continuation of application Ser. No. 65,320, Oct. 27, 1960. This application Apr. 20, 1964, Ser. No. 363,053
2 Claims. (Cl. 350—96)

This application comprises a continuation of my copending application Ser. No. 65,320 filed Oct. 27, 1960, now abandoned.

The field of this invention is that of image encoding and decoding and the invention relates, more particularly, to a novel and improved method for encoding and decoding an image, and to a novel and improved device and method of making a device for encoding and decoding optical images.

It has been proposed to construct a fiber-optical image-transmitting device in which light-transmitting fibers extend from end-to-end of the device, the fibers being adapted to transmit light by internal reflection in accordance with well-known principles. As proposed, the fibers are arranged in random groupings at each of the device ends so that the fibers are adapted to receive and transmit light from respective portions of a light image directed upon one device end for reproducing the image portions in a random, scrambled or encoded relation upon the other device end. Conversely, the fibers are adapted to receive and transmit light from portions of an image encoded by the device for reproducing the image portions in reoriented relation, thereby to permit reading of the image in its original form. A single image-encoding device of this type can be inexpensively constructed, and, regardless of the degree of care exercised in manufacturing the device, can be used for decoding an image scrambled by the device. Similarly, a pair of matched devices can be made by presently known techniques so that one device can be used for encoding an image and the other device can be used for decoding the image.

Image encoding-decoding devices are useful in banking procedures, for example, where they can be used for encoding a bank depositor's signature in unrecognizable form upon his individual bank deposit passbook. Thereafter, when the depositor makes a withdrawal from his account, a bank teller can verify the depositor's signature upon the usual withdrawal slip by decoding the scrambled signature appearing upon the depositor's passbook and by comparing the decoded signature with that appearing on the withdrawal slip. This signature verification method is considerably less involved than the procedures presently relied upon for this purpose and permits a substantial reduction in the cost and time required for handling many routine banking transactions.

However, for such a signature verification system to be practical, particularly for larger banks which may have a large number of branch offices, several image-encoding devices should be available for use in providing depositor's passbooks with encoded signatures, and each teller in each of the main or branch offices of the bank should be provided with a device adapted to decode the signature appearing upon any passbook presented to him. Thus, practical application of a signature verification system utilizing fiber-optical, image encoding-decoding devices requires use of a large number of substantially identical devices which are adapted for interchangeable use. However, whereas a single fiber-optical image encoding-decoding device or matched pairs of such devices can be made at relatively low cost when fibers are arranged in random groupings at each of the device ends, identical fiber optical image encoding-decoding devices suitable for interchangeable use for the above-described purposes have not been previously available in sufficient quantity for implementing the above-described signature verification system, and previously known methods of fabricating such devices would not permit economical manufacture of the devices in large quantities. Further, image decoding by use of such a device requires alignment of the device with an image encoded by the device in such a manner that respective device fibers are adapted to receive and transmit light from proper portions of the encoded image for reproducing the image in its original or decoded form. Where the fibers are grouped at random at the device ends, there is only one narrowly-defined position of alignment between the device and an image which has been encoded by the device so that device alignment, and therefore the process of image decoding, is time-consuming and difficult.

It is an object of this invention to provide a novel and improved method for encoding and decoding an energy image; to provide a method for encoding and decoding an image in which a succession of relatively long and narrow, strip-shaped segments of an image are rearranged in a predetermined different pattern for encoding the image and are thereafter reoriented for decoding the encoded image; to provide such a method for encoding and decoding optical images which is especially adapted for encoding and decoding images of handwritten signatures; and to provide such an image encoding and decoding method in which image decoding can be easily accomplished.

It is a further object of this invention to provide a novel and improved image encoding-decoding device; to provide a fiber-optical image encoding-decoding device which is adapted to scramble or encode portions of an image in a pattern of predetermined configuration and subsequently to decode said scrambled image portions to permit reading of the original image in recognizable form; to provide a fiber-optical image encoding-decoding device which is adapted to divide an image into a pattern of relatively long and narrow strip-shaped segments which extend in succession transversely across the entire image and to display said image segments in a predetermined different pattern for encoding the image, and which is adapted to divide said encoded image into said segments and to display said segments in reoriented relation for decoding the image; to provide a plurality of fiber-optical image encoding-decoding devices which are suitable for interchangeable use to encode and decode handwritten signatures; to provide such devices which are of small size and lightweight; to provide such devices which are of economical construction; and to provide such devices which are adapted to encode and decode images without substantial loss of image resolution.

It is a further object of this invention to provide novel and improved methods for manufacturing image encoding-decoding devices; to provide methods for manufacturing a plurality of image encoding-decoding devices with great accuracy so that such devices are adapted for interchangeable use; to provide methods for economically manufacturing a plurality of encoding-decoding devices suitable for interchangeable use; to provide methods for manufacturing fiber optical image encoding-decoding devices which are suited for interchangeable use; and to provide such manufacturing methods which are adapted to be performed by relatively unskilled personnel.

Briefly described, the method provided by this invention for selectively encoding and decoding an energy image comprises the steps of dividing the image into a predetermined pattern of relatively long and narrow, strip-shaped image segements, transmitting said image segments to a different location, and displaying corresponding, narrow, strip-shaped segements at said different location in a predetermined different pattern, said image segements cooperating in one of said patterns for forming a recognizable image and in the other of said patterns for forming an unrecognizable image. That is, in encoding the energy image, the original image is divided into strip-shaped segments which are then transmitted and displayed in a predetermined different pattern so that, although true segments of the original image are displayed, the segments do not cooperate to display the image as a whole in recognizable form; and in decoding an encoded image, the encoded image is divided into relatively long and narrow strip-shaped image segments which each correspond to a true segment of the original image, and the image segments are transmitted and displayed in a predetermined, different or reoriented, pattern in which the image segments cooperate to display the original image in recognizable form. In this manner, since the image segments are relatively narrow, the image segments are difficult to distinguish in an encoded image so that relatively limited scrambling of the segments is all that is required to assure effective encoding of the image. However, since the segments are relatively long, relatively few image segments will be required for reproducing an image in encoded or or decoded form and positioning of the few segments in the encoded or decoded images can be accurately and conveniently controlled. Preferably in at least one of said patterns such as the pattern of image segments which form an encoded image, the image is divided into a succession of image segments which extend transversely across the entire image whereby dividing of the image into appropriate image segments such as in subsequent decoding of the image can be easily accomplished.

In a practical method provided by this invention for selectively encoding and decoding an energy image such as an optical image, the image is divided into a pattern of relatively long and narrow strip-shaped segments which extend in succession transversely across the entire image. The image segments are transmitted to a different location and are displayed at said different location in a predetermined different pattern. The image segments in said different pattern also extend in succession transversely across the entire image but are displayed relative to each other in predetermined different sidewise directions and to predetermined different extents. Where an optical image of a handwritten signature is to be encoded and decoded, the image is preferably divided into segments which are sufficiently narrow so that no single segment will include a substantial part of any letter of the signature. Further, where a signature image is to be encoded and decoded, the displacement between adjacent image segments in an encoded image should be greater than 1/8 and the displacement between any two segments in the encoded image should be less than 1/4 inch.

Briefly described, the image encoding-decoding device provided by this invention includes a multiplicity of energy-transmitting fibers each preferably having an energy-transmitting core and an energy-insulating coating. For example, the device can include a multiplicity of light-transmitting fibers each having a light-transmitting core of a material of relatively high index of refraction and a light-insulating coating of a material of relatively low index of refraction so that the fibers are adapted to transmit light therethrough by internal reflection of the light through the fiber cores. The fibers are secured in side-by-side relation within a succession of rows, and the fiber rows are secured within a plurality of layers with one or more fiber rows being embodied in each layer, so that the fibers within each layer are parallel to each other and so that there is a predetermined angular relation between fibers in successive layers, whereby the fiber layers cooperate at corresponding ends in predetermined, different patterns to define respective faces. The fibers are adapted to receive light or other energy from respective portions of a light image or other type of image projected upon one face of the device, whereby the fibers in respective layers cooperate to divide the image into a succession of narrow strip-shaped image segments. The fibers are adapted to transmit said image portions to a different location at the other end of the device, and are adapted for substantially reproducing or displaying the image portions upon the other face of the device, thereby to reproduce or display said strip-shaped image segments upon said other face in a scrambled or encoded pattern of predetermined, different configuration.

In a preferred embodiment, the device provided by this invention is adapted to encode and decode optical images of hand-written signatures. In this embodiment, the device includes a multiplicity of light-transmitting fibers each of which is adapted to transmit light from an image portion which is less wide than the most narrow line of detail of the signatures to be encoded. Further, the fiber layers are sufficiently thin so that each layer is adapted to transmit a narrow segment of said signature image which does not include a substantial part of any single letter of the signature. Preferably the fibers in successive layers are arranged so that the angular relation between fibers in any two layers is less than 60° whereas the angular relation between fibers in any two adjacent layers is greater than 30°, the fibers being at least 1/4 inch long. Preferably, also, the sides of the fiber layers are encased in a suitable shape-retaining material for supporting and protecting the marginal edges of the fiber layers. In this construction, the image encoding-decoding device provided by this invention can be of suitably small size and lightweight, can transmit portions of a signature image to form an encoded signature image which is suitably scrambled but which is not difficult to decode by use of the device, and can encode and thereafter decode a signature image while retaining a suitable degree of image resolution.

According to the invention, the method of making the image encoding-decoding device provided by the invention includes the step of providing a plurality of ribbon-shaped members each embodying a multiplicity of energy-transmitting fibers which extend from end to end of the members in side-by-side relation. For example, a plurality of light-transmitting fibers each having a light-insulating coating can be individually wound in the form of helices, the adjacent convolutions of the helices can be secured together, and the helices can be cut transversely of the helix convolutions for forming flat ribbons in which fiber lengths from the helix convolutions extend from end to end of the ribbons in side-by-side relation. If desired, each fiber helix can embody more than one fiber thickness so that, when cut, the ribbons formed from the helices can each embody more than one row of fiber lengths which extend from end to end of the ribbons in side-by-side parallel relation. Where the image encoding-decoding device provided by the method is to be used in a signature verification system, the fibers provided by the method are preferably adapted to transmit image portions which are less wide than the most narrow line of detail of the signatures to be encoded, and the fiber ribbons are sufficiently thin so that each ribbon is adapted to transmit an image segment which does not include a substantial part of any single letter of the signature.

The method includes the further step of arranging the ribbons or ribbon-shaped members in layers so that the angular relation between fibers in successive layers is diversified in predetermined manner. Preferably the ribbon layers are arranged so that the angular relation between fibers in any two layers is less than 60° and the angular relation between fibers in any two adjacent layers is greater than 30°. The method further includes the steps of securing the layers together, preferably by cementing the layers so that spacing between adjacent layers is constant throughout the length of the layers; cutting the layers transversely of the layer fibers so that corresponding ends of the fibers cooperate to define respective faces, the ribbon layers preferably being cut along parallel planes spaced at least 1/4 inch apart; and, where light transmitting fibers are utilized, polishing the device faces for optically finishing the ends of the ribbon fibers so that the fibers are adapted to receive light, for example from respective portions of a light image projected upon one device face, for substantially reproducing the image portions upon the other device face in a scrambled pattern of predetermined configuration. Preferably, the sides of the ribbon layers are encased with moldable material and the material is cured for making the material shape-retaining to support and protect the marginal edges of the ribbons.

Other objects, advantages and details of the method for encoding and decoding an energy image, of the encoding-decoding device and of methods of making the device provided by this invention will appear in the following description of a preferred method of encoding and decoding an anergy image, of preferred embodiments of the device and of preferred methods of making the device according to this invention, the description referring to the drawings in which:

FIG. 1 is a diagrammatic view illustrating the preliminary steps of the method provided by this invention for manufacturing the device provided by this invention;

FIG. 2 is a section view along line 2—2 of FIG. 1;

FIG. 3 is a diagrammatic view similar to FIG. 1 showing subsequent steps in the method provided by this invention;

FIG. 4 is a plan view of the device component produced by the method steps illustrated in FIGS. 1 and 3;

FIG. 5 is a section view along line 5—5 of FIG. 4;

FIG. 6 is a plan view of the device components provided by this invention illustrating the final steps in the method provided by this invention;

FIG. 7 is a plan view of the device provided by this invention;

FIG. 8 is a perspective view of the device of FIG. 7 illustrating use of the device in a signature verification system for performing the method of encoding and decoding an energy image according to this invention;

FIG. 9 is a partial view to enlarged scale similar to FIG. 8; and

FIG. 10 is a diagrammatic view illustrating use of the methods and device provided by this invention.

Referring to the drawings, FIGS. 1–6 illustrate a preferred method of making the image encoding-decoding device 10 provided by this invention, and FIGS. 7–10 illustrate the device itself and use of the device in a signature verification system for performating the novel method of image encoding and decoding as provided by this invention.

According to the method of device manufacture provided by this invention, there is provided a plurality of energy-transmitting fibers 12 each of which preferably has an energy-transmitting core 12.1 and an energy-insulating coating 12.2 as shown in FIG. 2. Preferably the fiber core comprises a light-transmitting material such as flint glass having a relatively high index of refraction and is provided with a light-insulating coating of a material such as crown glass having a relatively low index of refraction, whereby each fiber is adapted to transmit light from end to end thereof by internal reflection of the light through the fiber core in accordance with well-known principles. However, it should be understood that materials other than the noted flint and crown glasses can be used to provide fibers which are adapted to transmit light or other electromagnetic energy, and, if desired, the fibers can be adapted in any conventional manner to transmit other forms of energy within the scope of this invention. For example, the fiber cores could be made of metal or other electrically conductive material and could be provided with electrically insulating coatings of a material such as glass.

Each fiber 12 is preferably wound individually upon a mandrel 14 for forming helix 16 as shown in FIGS. 1 and 3, the fiber preferably being taped to the mandrel as at 18 and being wound on the mandrel for forming a helix of constant diameter. Then, the adjacent convolutions of each fiber helix are secured together. Most advantageously, the fibers are secured together with a suitable adhesive 20 such as a cellulose nitrate or polyvinyl alcohol dope. Then the helices are cut transversely of the helix convolutions, for example, bu cutting each helix with shears or a diamond glass cutter along the line 22 shown in FIG. 3, to form the flat fiber ribbons 24 shown in FIGS. 4 and 5 in which lengths of the fibers 12 from the helix convolutions extend from end to end of the ribbons in side-by-side, preferably parallel, relation. If desired, each fiber can be wound in several thicknesses upon the mandrel so that, when cut, the ribbons formed from each helix will embody more than one row of fiber lengths which extend from end to end of the ribbon in side-by-side parallel relation as shown in FIG. 5. Alternatively, several fiber ribbons each embodying a single row of fibers in side-by-side relation can be superimposed with the fibers in each ribbon in parallel relation and can be secured together for forming a single ribbon embodying a plurality of fiber rows. Fiber ribbons 24 made in the above-described manner are preferred for use in the image encoding-decoding device of this invention because such ribbons can be economically manufactured with assurance that each fiber length in the ribbon occupies substantially the same relative position therein throughout the length of the ribbon. However, similar ribbons constructed in any suitable manner are within the scope of this invention.

According to the invention, the ribbons or ribbon-shaped members 24 are arranged in layers, as shown in FIG. 6, so that the fiber lengths in successive layers have a predetermined angular relation to each other. The succession of ribbon layers need not be symmetrically arranged as indicated by the points 25 shown in FIG. 6 which represent the centers of the illustrated ribbons 24. Such an arrangement of the layers can be easily accomplished through use of guide means such as the illustrated guide block 26, for example, the guide block being provided with an aperture 26.1 which has grooves 26.2 so that the aperture is adapted to receive ribbons therein only when the ribbons are properly oriented at selected angles relative to the block. Then any desired number of ribbons can be inserted within the aperture to build up a stack of ribbons of the desired thickness, each ribbon being fitted within the aperture with the appropriate angular orientation in a predetermined order or sequence. Preferably the fiber ribbons 24 have a sufficiently firm shape so that the ribbons can be easily positioned within the guide means, and accordingly, where relatively small flexible fibers are embodied in the ribbons, it may be desirable to prepare ribbons which embody more than one row of fibers therein in the manner above described.

As the ribbons 24 are arranged in layer relation, they are preferably secured together, for example with an epoxy resin or a cellulose acetate or polyvinyl alcohol dope (not shown), for forming an integrated ribbon assembly 28. As shown in FIG. 5, the thickness T of the ribbons is preferably controlled with a reasonable degree of accuracy so that the ribbons can be easily secured in layers in which the spacing between centers of ribbon fibers in adjacent layers is constant throughout the length of the ribbons. The overall height of the ribbon assembly 28 can be accurately controlled in any conventional manner, for example by use of mechanical press means (not shown) which function to compress the desired number of fiber ribbons to a predetermined overall height. Then the ribbon assembly 28 is cut transversely of the ribbon fibers embodied in the assembly, for example by cutting the assembly with a diamond saw along the lines 30 and 32 shown in FIG. 6, for providing the preferably planar faces, 34 and 36 respectively (see FIG. 7), at each end of the ribbon assembly unit 28a. Preferably, but not necessarily, the planar faces 34 and 36 are disposed in parallel relation. Thereafter, where light-transmitting fibers have been utilized, the faces 34 and 36 are ground and polished in conventional manner so that the ends of the ribbon fibers terminating in the faces are optically finished for facilitating the reception of light therein. If the ribbon assembly is sufficiently large, additional cuts can be made along lines properly spaced from and parallel to the lines 30 and 32 for providing more than one substantially identical ribbon assembly unit.

Preferably, the sides of the ribbon assembly unit 28a are encased in a suitable moldable material 31, for example by coating the sides of the assembly with successive coats of a plastic material such as epoxy resin, polystyrene or other suitable material, and the material is cured or otherwise treated in conventional manner for making the material shape-retaining, thereby to support and protect the marginal edge portions of the ribbons 24 embodied in the assembly. If desired, the ribbon assembly 28 can be encased in the moldable material 31 prior to cutting, whereby the moldable material will facilitate cutting of the assembly to provide the smooth faces 34 and 36. Any other suitable means for encasing the sides of the fiber ribbons is within the scope of this invention. The above-described method of device manufacture provides the image encoding-decoding device 10 illustrated in FIGS. 7–10.

The image encoding-decoding device 10 has faces 34 and 36 which are defined by the ends of the fiber ribbons or layers embodied in the device, the fibers in any one device layer having the same position relative to each other in each of the device faces. Since each of said fibers is adapted to receive light or other energy at one device face and is adapted to reproduce said light or energy on the other device face, the fibers in any one device layer cooperate to receive light or energy from portions of a relatively long and narrow, strip-shaped segment of an energy image directed upon one device face for reproducing said image segment in mosaic form upon the other device face. However, since the fibers in successive layers of the device 10 are arranged in angular relation to each other, a fiber ribbon or layer which terminates in one position in one device face 34 will terminate in a different position within the other device face 36, the position of the layer end in one of said faces being displaced in a horizontal direction from its position in the other device face. That is, the fiber ribbons or layers cooperate in a predetermined different pattern to define the other device face. Accordingly the fiber layers are adapted to receive light or other energy from respective segments of an energy image directed upon one device face, thereby to divide the image into a pattern of such segments, and are adapted to reproduce said image segments at a different location upon the other device face in a predetermined different pattern. As will be readily understood, the device can be adapted to divide an image directed upon one device face into a succession of strip-shaped image segments and can reproduce the image segments upon the other device face so that the image segments do not cooperate to display the original image in recognizable form. In this manner, the device can be used to encode an image. Conversely the device can be adapted to divide an encoded image directed upon said other device face into a plurality of image segments each of which comprises a relatively long and narrow, strip-shaped segment of the original image. The device can reproduce said image segments upon said one device face for displaying the segments in reoriented relation, whereby the segments cooperate to display the original image in recognizable form.

It has been noted that the fiber ribbons 24 embodied in the device 10 can be accurately formed by the methods disclosed herein, so that relative position of each fiber length within the ribbon is controlled. It has also been noted that the arrangement of the ribbons in a predetermined angular relation to form the ribbon assembly 28 can be easily accomplished. It should also be noted that the position of each layer end within the faces 34 and 36 of the device 10 is primarily determined by the angular relation of the fiber layers and by the distance L between the device faces. (See FIG. 6.) Cutting and polishing of the ribbon assembly 28 to form and space the device faces 34 and 36 can be accurately achieved by conventional techniques. Thus, it can be said that the method of device manufacture provided by this invention is adapted to produce a device having accurately predetermined physical characteristics, whereby any desired number of substantially identical devices can be provided for interchangeable use in the following manner.

A light image of the handwritten signature 38, for example, can be directed upon a face of the device 10 by any suitable means. For example, the signature 38 can be written in opaque ink upon a translucent card 38a. The card can then be placed against the device face 34 as shown in FIG. 8 and light from any suitable source (not shown) can be directed through the card upon said device face for projecting an image of the signature 38 upon said face. The image directed upon the face can extend along the line of ribbon layers, as illustrated, or can extend obliquely or transversely across said line of ribbon layers as desired. In the illustrated case, the central, solid portions of the device faces 34 and 36 have a length F of approximately 3 inches and a height O of approximately ½ inch for accommodating most signatures of proportions generally encountered in business transactions.

Each fiber terminating in the device face 34 is adapted to receive light from illuminated portions of the face 34 for projecting said light from the fiber ends terminating in the device face 36, whereas these fibers shielded from light by the opaque signature image 38 do not project light from the face 36 and appear dark thereon as shown at 40 in FIGS. 8 and 9. The fibers terminating in the device face 34 are arranged in layers as noted above so that, as the fibers receive light or are shielded from light on the device face 34, the fibers in respective layers effectively divide the image appearing on that face into a succession of relatively long and narrow, strip-shaped image segments 39 which extend transversely across the entire image. Similarly, as the fibers project light or appear dark upon the device face 36, the fibers in respective layers substantially reproduce or display said strip-shaped image segments 39 on the face 36. As the fiber layers are disposed in angular relation to each other, the image segments 39 reproduced on the face 36 are displayed in a different pattern from that in which the image segments were arranged in the device face 34 so that the dark-appearing portions 40 of the image segments appearing on face 36 do not cooperate to display the original image 38 in recognizable form. This is best illustrated by reference to FIG. 9 which comprises a partial view of the device face 36 drawn to an enlarged scale. In this view, it can be seen that, where each fiber ribbon embodies several rows of fibers in side-by-side relation and the image 38 extends along the line of ribbon layers in the face 34, the fibers in each layer cooperate to reproduce or display fragments or narrow, strip-shaped segments 39 of the original signature image in mosaic form on the face 36 but that successive horizontal layers or segments of the image 38 reproduced on the device face 36 are horizontally displaced relative to each other to different extents and in different directions. Thus the pattern of dark-appearing image portions displayed upon the device face 36 constitutes an encoded representation 40a of the original signature image. Of course, where the image 38 is directed upon the device face 34 obliquely or transversely relative to the ribbon layers in the face 34, the strip-shaped image segments displayed on the device face 36 are correspondingly displaced.

It will be noted that, as illustrated in FIG. 8, the encoded representation 40a of the signature 38 appears on the device face 36 in a left to right relationship such that, for example, the left-hand portion of the encoded signature 40a corresponds to the left-hand portion of the original signature. Reversal or inversion of the card 38a in encoding the signature would, of course, correspondingly reverse or invert the encoded representation of the signature which would appear on the device face 36.

The signature 38 may be that of a bank depositor, for example, and the encoded representation of his signature 40a can be recorded upon a photograph, transparency or other suitable means and can be attached, as at 40b in FIG. 10, to a passbook 42 issued to the depositor by the bank. A contact print of the encoded signature 40a appearing on the device face 36 as illustrated would, of course, record the encoded signature image in reverse or inverted order so that, for example, the left-hand portion of the encoded signature recorded on the print would correspond to the right-hand portions of the original signature 38 and the encoded signature 40a appearing on the device face 36. However, various conventional means for recording the encoded signature are available by means of which the signature would be recorded without image reversal if desired. The passbook 42 could be the passbook which the depositor would customarily receive as an indication of his entitlement to money deposited to his account in a bank.

Subsequently, when the depositor makes a withdrawal from his account in the usual manner by signing a withdrawal slip authorizing the bank to pay out the desired sum of money from his account, a bank teller can verify the depositor's signature by use of an image encoding-decoding device 10. The teller can align the face 36 of a device 10 with the encoded representation of the depositor's signature as it appears on his passbook, preferably by use of any suitable guide means, whereby the fibers of the device 10 are adapted to receive light from respective portions of the encoded image to reproduce said imaged portions upon the device face 34. The device face is defined by the ends of ribbon layers terminating in the face so that the fibers in each layer receive light from strip-shaped segments of the encoded image and reproduce said strip-shaped image segments upon the face 34. Where the fiber layers are aligned with appropriate strip-shaped segements 39 of the encoded image, the image segments into which the encoded image is divided can comprise true segments of the original image 38 and can be reproduced on the device face 34 in reoriented relation to display the image 38 in recognizable form. Since the ends of ribbon layers defining face 36 extend transversely across the entire face, the face can be conveniently aligned with the encoded image by movement of the device along a single line of adjustment for dividing said encoded image into the segments 39. The light for forming a light image on the device face 36 can be light from any available source which enters the viewing end of the decoding device and which is reflected from the encoded representation of the depositor's signature, or, if desired, the teller can be provided with a supplementary light source (not shown) for directing light through the photograph or transparency 40b attached to the depositor's passbook. As will be readily understood, the strip-shaped image segments can be reproduced upon the device face 34 in reoriented relation so that the dark-appearing portion 40 of the segments cooperate to display the depositor's signature in a decoded or recognizable form. Where the encoded signature appearing on the passbook comprises a contact print of the encoded signature image appearing on the device face 36 as illustrated in FIG. 8, the signature decoded from the contact print by use of the device 10 will comprise a mirror image of the original signature 38 and can be conveniently read with a mirror in a manner which will be readily understood. However, if the card 38a has originally been reversed in producing an encoded image on the device face 36, or if recording of the encoded image produced on the face 36 is accomplished without effecting image reversal as suggested above, the decoded image can comprise a substantial duplicate of the original signature which can be read directly without recourse to mirrors or other similar means. The teller can then visually compare the decoded image of the depositor's signature with the signature appearing upon the withdrawal slip. Issuance of the passbook with the depositor's signature thereon does not entail any significant risk since a putative forger, not having access to an encoding-decoding device, could not readily use the encoded representation as an aid in forging the depositor's signature even if he were to come into possession of the passbook.

In order to permit encoding of a signature image in a pattern sufficiently scrambled so that the encoded signature is not recognizable, the displaced lines of the image should be quite narrow. Preferably each image segment into which the image is divided should be sufficiently narrow so that no segment should include a significant portion of any letter of the signature. Further, in order to encode a signature and then subsequently to decode the signature into recognizable form, the individual fibers embodied in the device 10 should be adapted to transmit image portions while maintaining a suitable degree of image resolution. For these purposes, fibers slightly less wide than the smallest line of detail of the signatures to be encoded are satisfactory. Thus, a fiber core having its diameter or longest transverse dimension less than .010 inch would be required in a device adapted to encode signatures or most other discrete-line images, whereas fiber cores less than .003 inch in diameter would be required in a device adapted to encode continuously toned or shaded images. The fiber coatings should be as thin as possible while being adequate to prevent light leakage between adjacent fibers.

In a signature encoding-decoding device, it is also preferred that the adjacent horizontal lines of a signature image be displaced a distance D of at least ⅛ inch from each other in order to form an encoded image which is not easily recognizable (see FIG. 9). However, displacement of the adjacent image lines more than ¼ inch does not contribute substantially in making an encoded signature image unrecognizable to any added degree. In fact, by separating the end portions of the signature to an unnecessary extent, excessive displacement may result in inadequate encoding of the end portions of the signature. Accordingly, as shown in FIG. 6, it is preferred that the angular relation A between the fibers in any two ribbon layers in a signature encoding-decoding device be less than 60° and that the angular relation B between the fibers in any two adjacent ribbon layers be more than 30°. This construction requires spacing of the device faces at a distance L of only ¼ inch while providing the desired degree of displacement between adjacent image lines in an encoded image, thereby providing a suitably small, compact and lightweight device with a minimum amount of fiber material. It will also be noted by reference to FIG. 8 that the length E of an encoded image is greater than the length S of the original image due to horizontal displacement of image portions in the encoded image, and it is desirable to provide only that degree of image displacement which is necessary for encoding the image, thereby to minimize the space needed upon the passbook 42, for example, for recording an encoded image. For this reason, also, offsetting of the ribbon centers as indicated at 25 in FIG. 6 is preferably limited so that the device faces 34 and 36 can be reasonably small while being adapted to receive the desired size of image thereon.

Although the preferred angular relations between the fibers in successive ribbon layers of the device 10 have been specified above for providing a suitably compact device 10, it should be noted that, where the fibers 12 comprise light-transmitting fibers, the fibers should not be inclined to the device faces 34 and 36 at angles which exceed the light acceptance angle of such fibers. That is, as will be understood by persons skilled in the use of fiber optics, light-transmitting fibers of the character described are adapted to transmit light by total internal reflection only when the angle of incidence of such light upon the interface between each fiber and its coating is greater than the critical angle of incidence of the fibers, light entering the fiber ends at an angle less than said critical angle passing through the fiber coating without being reflected. As is well known, the critical angle of incidence of the fiber is determined by the relationship of the indices of refraction of the materials selected for forming the fiber and its coating and, where the critical angle of incidence of the fiber is relatively small, each fiber has a large light acceptance angle and is adapted to accept and transmit a substantial amount of light. For fibers adapted to have the angular relations specified above as preferred, the fibers should each have a light acceptance angle of at least 60° and preferably, for transmitting a substantial amount of light, should have a light acceptance angle of as much as 120°. A fiber core 12.1 of a material having an index of refraction of 1.62 and a fiber coating 12.2 of a material having an index of refraction of 1.52 cooperate to provide a fiber 12 having a 60° light acceptance angle, for example. A fiber core material having an index of refraction of 1.75 and a fiber coating material having an index of refraction of 1.52 cooperate to provide a fiber having a 120° light acceptance angle.

It should be understood that although particular embodiments of the devices and method of making the devices according to this invention have been described for the purpose of illustration, this invention includes all modifications and equivalents thereof which fall within the scope of the appended claims.

Having described my invention, I claim:

1. An encoding device comprising a multiplicity of light-conducting optical fibers each having a core of light-transmitting material of relatively high index of refraction and a coating of light-transmitting material of relatively low index of refraction, said fibers being arranged in a plurality of groups and being secured together in side-by-side relation within said groups to form respective fiber ribbons, said fiber ribbons being secured together in superimposed relation to each other so that the fiber ribbons occupy respective parallel planes and form successive discrete layers of the fiber device, said fibers being parallel to each other within each ribbon so that all of the fibers in said ribbon have the same angular relation to the fibers in other ribbons, said fiber ribbons being angularly oriented relative to each other within said parallel planes so that the angular relation between the fibers in different fiber ribbons is diversified in predetermined manner, said fibers cooperating at one end to define one substantially rectangular planar image face and at their opposite end for defining another substantially rectangular planar image face, the fibers within respective fiber ribbons defining successive parallel strips which extend entirely across said one image face substantially one above another to receive and transmit light from successive parallel strips of a light image projected upon said one face for dividing said image into strip-shaped segments, the fibers within respective fiber ribbons defining successive parallel strips which extend entirely across said other image face in reoriented relation to each other substantially one above another to reproduce said image strips upon the other of said image faces in reoriented relation to each other for encoding said image.

2. An encoding device comprising a multiplicity of energy-transmitting fibers, said fibers being arranged in a plurality of groups and being secured together in side-by-side relation within said groups to form respective fiber ribbons, said fiber ribbons being secured together in superimposed relation to each other so that the fiber ribbons occupy respective parallel planes and form successive discrete layers of the fiber device, said fibers being parallel to each other within each ribbon so that all of the fibers in said ribbon have the same angular relation to the fibers in other ribbons, said fiber ribbons being angularly oriented relative to each other within said parallel planes so that the angular relation between the fibers in different fiber ribbons is diversified in predetermined manner, said fibers cooperating at one end to define one substantially rectangular planar image face and at their opposite end for defining another substantially rectangular planar image face, the fibers within respective fiber ribbons defining successive parallel strips which extend entirely across said one image face substantially one above another to receive and transmit energy from successive parallel strips of an energy image projected upon said one face for dividing said image into strip-shaped segments, the fibers within respective fiber ribbons defining successive parallel strips which extend entirely across said other image face in reoriented relation to each other substantially one above another to reproduce said strip-shaped image segments in reoriented relation to each other upon said other face for encoding said image.

References Cited

UNITED STATES PATENTS

| | | | |
|---|---|---|---|
| 3,141,106 | 7/1964 | Kapany | 88—1 |
| 3,145,247 | 8/1964 | Meltzer | 88—1 |
| 3,227,535 | 1/1966 | Woodcock | 88—1 |

OTHER REFERENCES

Strong Concepts of Classical Optics, W. H. Freeman and Company, San Francisco, 1958, pp. 562–564 relied on.

DAVID H. RUBIN, *Primary Examiner.*

JOHN K. CORBIN, JEWELL H. PEDERSEN,
*Examiners.*